US012375791B2

(12) United States Patent
Gilson et al.

(10) Patent No.: US 12,375,791 B2
(45) Date of Patent: Jul. 29, 2025

(54) SYSTEM FOR UNDERWATER DEPTH PERCEPTION HAVING MULTIPLE IMAGE SENSORS

(71) Applicant: VOYIS IMAGING INC., Waterloo (CA)

(72) Inventors: Christopher Allan Gilson, Markham (CA); Stanley James Brown, Waterloo (CA)

(73) Assignee: VOYIS IMAGING INC., Ontario (CA)

( * ) Notice: Subject to any disclaimer, the term of this patent is extended or adjusted under 35 U.S.C. 154(b) by 37 days.

(21) Appl. No.: 18/367,622

(22) Filed: Sep. 13, 2023

(65) Prior Publication Data
US 2025/0088726 A1    Mar. 13, 2025

(51) Int. Cl.
| | | |
|---|---|---|
| H04N 23/50 | (2023.01) | |
| H04N 13/00 | (2018.01) | |
| H04N 13/239 | (2018.01) | |
| H04N 23/54 | (2023.01) | |
| H04N 23/90 | (2023.01) | |

(52) U.S. Cl.
CPC ......... *H04N 23/555* (2023.01); *H04N 13/239* (2018.05); *H04N 23/54* (2023.01); *H04N 23/90* (2023.01); *H04N 2013/0081* (2013.01)

(58) Field of Classification Search
CPC .... H04N 23/555; H04N 13/239; H04N 23/54; H04N 23/90; H04N 2013/0081
See application file for complete search history.

(56) References Cited

U.S. PATENT DOCUMENTS

| | | |
|---|---|---|
| 8,542,413 B2 | 9/2013 | Gillham et al. |
| 9,612,332 B2 | 4/2017 | Wicks et al. |
| 10,116,841 B2 | 10/2018 | Boyle et al. |
| 10,116,842 B2 | 10/2018 | Boyle et al. |
| 10,158,793 B2 | 12/2018 | Boyle et al. |

(Continued)

FOREIGN PATENT DOCUMENTS

AU    2015250746 B2    10/2015

OTHER PUBLICATIONS

Moore et. al., Development of a New Underwater Bathymetric Laser Imaging System: L-Bath, Aug. 1, 2000.

(Continued)

*Primary Examiner* — Nasim N Nirjhar
(74) *Attorney, Agent, or Firm* — Edlavitch Law PLLC

(57) ABSTRACT

Systems described herein use either multiple image sensors or one image sensor and a complementary sensor to provide underwater depth perception. The systems include a computing system that provides the underwater depth perception based on data sensed by the multiple image sensors or the one image sensor and the complementary sensor. The systems can include a submersible device (such as a submersible mobile machine) that includes a holder configured to hold the one image sensor. The holder can be configured to hold the computing system in addition to the one image sensor. And, in some embodiments, the holder is configured to hold the complementary sensor in addition to the computing system and the one image sensor. Alternatively, in some embodiments, the holder is configured to hold the multiple image sensors. And, the holder can be configured to hold the computing system in addition to the multiple image sensors.

20 Claims, 9 Drawing Sheets

(56) References Cited

U.S. PATENT DOCUMENTS

| | | | |
|---|---|---|---|
| 10,163,213 | B2 | 12/2018 | Boyle et al. |
| 10,930,013 | B2 | 2/2021 | Boyle et al. |
| 10,943,321 | B2 | 3/2021 | Boyle et al. |
| 11,457,144 | B2 | 9/2022 | Wallace et al. |
| 11,561,553 | B1* | 1/2023 | Dydek ............... G05D 1/0246 |
| 2008/0319704 | A1* | 12/2008 | Forster ............. G01B 11/2545 |
| | | | 702/150 |
| 2014/0300885 | A1 | 10/2014 | Debrunner et al. |
| 2017/0046845 | A1 | 2/2017 | Boyle et al. |
| 2019/0011552 | A1 | 1/2019 | Embry et al. |
| 2019/0017941 | A1 | 1/2019 | Gillham et al. |
| 2021/0201452 | A1 | 7/2021 | Treibitz |
| 2023/0045358 | A1* | 2/2023 | Kobayashi ............ G03B 15/00 |

OTHER PUBLICATIONS

Nils Tornblom, Underwater 3D Surface Scanning using Structured Light, Dec. 2010.
Bruno et al., Experimentation of structured light and stereo vision for underwater 3D reconstruction, Jul. 2011.
Roman et al., Application of Structured Light Imaging for High Resolution Mapping of Underwater Archaeological Sites, Abstract, May 2010.
Jaffe et al., Underwater Optical Imaging: Status and Prospects, 2011.
Scharstein et al., High-Accuracy Stereo Depth Maps Using Structured Light, Jun. 2003.
Hall-Holt et al., Stripe Boundary Codes for Real-Time Structured-Light Range Scanning of Moving Objects, Abstract, 2001.
Caimi et al., Underwater Optics and Imaging, 2008.
Mullen et al., Modulated Laser Line Scanner for Enhanced Underwater Imaging, Abstract, Nov. 11, 1998.
Weiqi et al., Range-gated underwater laser imaging system based on intensified gate imaging technology, Abstract, Feb. 2008.
Fournier et al., LUCIE ROV mounted laser imaging system, Abstract, Dec. 1992.
Bonin et al., Imaging Systems for Advanced Underwater Vehicles, Feb. 10, 2011.
Alexander Rumson, The application of fully unmanned robotic systems for inspection of subsea pipelines, Sep. 1, 2021.
Maki et al., Development of the AUV Tri-TON, Abstract, 2013.
Brignone et al., First sea trials of a laser aided three dimensional underwater image mosaicing technique, 2011.
Nakatani et al., 3D Visual Modeling of Hydrothermal Chimneys using a Rotary Laser Scanning System, Abstract, 2011.
Maki et al., Volumetric mapping of tube worm colonies in Kagoshima Bay through autonomous robotic surveys, Jul. 2011.
Maki et al., Autonomous detection and vol. determination of tubeworm colonies from underwater robotic surveys, Abstract, 2010.
Maki et al., Real time path-planning of an AUV based on characteristics of passiveacoustic landmarks for visual mapping of shallow vent fields, Abstract, 2007.
Levoy et al., Improving underwater vision using confocal imaging, Jun. 28, 2009.
Vasilescu et al., Color-Accurate Underwater Imaging using Perceptual Adaptive Illumination, Aug. 2011.
Strand et al., Laser line-scan fluorescence and multispectral imaging of coral reef environments, Abstract, 1997.
Goddijn-Murphy et al., Fundamentals of in Situ Digital Camera Methodology for Water Quality Monitoring of Coast and Ocean, Jul. 22, 2009.
https://www.ivm-technologies.com/#1.
https://vaarst.com/subslam-3d-imaging-technology/.
https://zupt.com/services/3d-recon-20.
https://cathxocean.com/vanguard/.
https://www.savante.co.uk/subsea-cameras-products/vergence-hd-stereo-photogrammetry-camera.
Akkaynak et al., Sea-Thur: A Method for Removing Water From Underwater Images, Abstract, 2019.
International Search Report for PCT International Application Serial No. PCT/CA2024/051128.
Written Opinion of the International Search Authority for PCT International Application Serial No. PCT/CA2024/051128.
Computer stereo vision, from Wikipedia of Apr. 22, 2022, https://web.archive.org/web/20220422153444/https://en.wikipedia.org/wiki/Computer_stereo_vision.

\* cited by examiner

900 providing of depth perception or some of the corresponding calculations based on digital signal processing
902

↓ inputting the enhanced input from the signal processing into an artificial neural network
904 further processing, by the computing scheme 907, inputs for the providing of depth perception or some of the corresponding calculations or the enhanced input of step 902

SCHEME 907       906

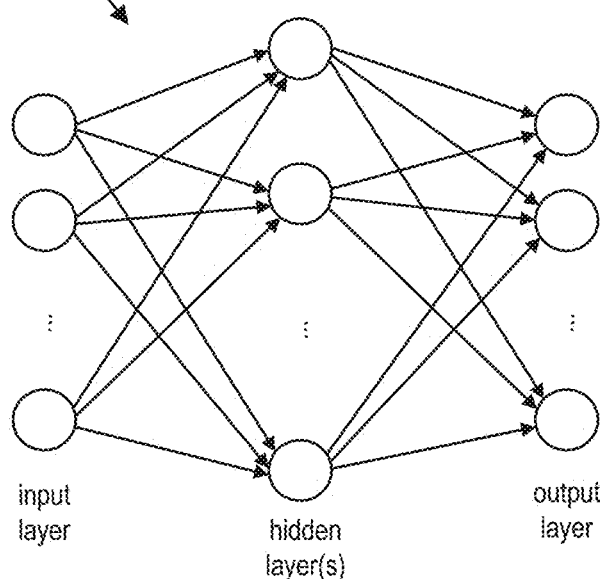

input layer    hidden layer(s)    output layer using an output of the computing scheme or a derivative thereof to enhance providing of depth perception or some of the corresponding calculations
908

FIG. 9

Camera Image · Real-time 3D Point Cloud

Camera Image · Real-time Color Correction

SYSTEM FOR UNDERWATER DEPTH PERCEPTION HAVING MULTIPLE IMAGE SENSORS

TECHNICAL FIELD

The present disclosure relates to methods and systems for underwater depth perception.

BACKGROUND

Depth perception includes the perceiving of distances to objects whether or not such objects are perceived through a visual system, a non-visual system, or a partial-visual system. Regarding underwater depth perception, many technologies have evolved throughout the last century to provide perceiving of distances to objects underwater whether or not such objects are perceived through a visual system, a non-visual system, or a partial-visual system. Depth perception is often associated with perceiving distances to objects using a visual system and visual perception. Also, it is commonly associated with perceiving environments and objects in three dimensions visually. For example, with human depth perception, typically such perception occurs through stereopsis and adjustments of the eyes. However, for this disclosure, it is to be understood that the definition of depth perception includes all forms of depth perception in the broadest sense and includes perception via visual systems, non-visual systems, or partial-visual systems as well as perception made by a machine.

With technologies that provide depth perception underwater, there are many limitations and technical problems to be overcome. For example, observing an underwater environment and objects within it, effectively, can demand a multitude of sensors of varying types. Historically, systems implementing underwater depth perception have had to rely on laser-based sensors, sonar-based sensors, and navigation sensors, to explore underwater environments. Exploration underwater requires some sort of depth perception (whether visually based or not) to avoid collisions with objects such as the seabed, rocks, moving organisms of substantial size, and vehicles. For instance, it is known to determine relative position through underwater depth perception using sonar or laser-based sensors. Such sensors include multibeam sonar, forward-looking sonar, and LiDAR, most of which can provide real-time feedback for a human pilot, or autonomous controller, to navigate and interpret the surroundings. However, such feedback can be lacking in detail and specificity and can be overwhelming for onboard computing resources. Also, as another instance of the many limitations and technical problems to resolve, it is typical to use or completely rely on remote computing that is not a part of a device submerged underwater utilizing the depth perception. Relying on remote computing can cause delays which can limit the ability to use depth perception in real time. Further, it is important to note that the aforementioned example limits and technical problems described in this section are just some of the many limitations and technical problems that can be improved upon in underwater depth perception.

SUMMARY

Described herein are novel technologies for underwater depth perception. The techniques disclosed herein provide specific technical solutions to at least overcome the technical problems mentioned in the background section or other parts of the application as well as other technical problems not described herein but recognized by those skilled in the art.

As mentioned in the background section, depth perception includes the perceiving of distances to objects whether or not such objects are perceived through a visual system, a non-visual system, or a partial-visual system, and regarding underwater depth perception, many technologies have evolved throughout the last century to provide perceiving of distances to objects underwater. Depth perception is often associated with perceiving distances to objects using a visual system and visual perception. Also, it is commonly associated with perceiving environments and objects in three dimensions visually. However, for the purposes of this disclosure, it is to be understood that the definition of depth perception includes all forms of depth perception in the broadest sense and includes perception via visual systems, non-visual systems, or partial-visual systems as well as perception performed by a machine. And, for the sake of this disclosure, depth perception described herein is limited to depth perception performed by a machine. To put it another way, depth perception described herein is defined as the ability to judge or determine one or more distances of one or more objects or the respective spatial relationships of objects at different distances by a machine. For example, depth perception can include perceiving distances visually or without a visual system and through other types of sensing capabilities. An example machine that is configured for depth perception can include sensors (e.g., visual or non-visual sensors) and a computing system operating together to judge or determine one or more distances of one or more objects or the respective spatial relationships of objects at different distances.

As mentioned, described herein are novel technologies for underwater depth perception. The technologies can include systems and methods for underwater depth perception. For example, embodiments of the technologies can include systems using either multiple image sensors or one image sensor and a complementary sensor to provide underwater depth perception. The systems can also include a computing system that provides the underwater depth perception based on data sensed by the multiple image sensors or the one image sensor and the complementary sensor. The systems can also include a submersible device (such as a submersible mobile machine) that includes a holder configured to hold the one image sensor. The holder can be configured to hold the computing system in addition to the one image sensor. And, in some embodiments, the holder is configured to hold the complementary sensor in addition to the computing system and the one image sensor. Alternatively, in some embodiments, the holder is configured to hold the multiple image sensors. And, the holder can be configured to hold the computing system in addition to the multiple image sensors.

In some embodiments, the camera can be replaced with another type of sensor that can capture data points (such as enough data points to provide an image) of an area near the device. For example, in some embodiments, LIDAR attached to the device captures data points or an image of an area in front of the machine, and the computing system processes such data points or the image to perform depth perception. In some embodiments, the data points captured by the LIDAR are converted into an image for processing to perform depth perception. Also, in some embodiments, CMOS or CCD image sensors attached to the device can capture data points or an image of an area in front of the machine, and the computing system processes such data points or the image to perform depth perception. In some other embodiments, the camera can be an RGB camera or a grayscale camera, a CMYK camera, or any other type of camera having a different color mode than RGB, grayscale, or CMYK. And, regardless of the type of camera, the captured images of the camera can be processed by the computing system using depth perception techniques. In some embodiments, the computing system includes a graphical processing unit (GPU).

Also, since the device can be equipped with a location tracking system or a machine position tracking system (in some embodiments), the data from the depth perception as well as the location tracking system or a machine position tracking system, can then be transformed into input for generation of a map or instructions for a control system of the device.

With respect to some embodiments, disclosed herein are computerized methods for providing underwater depth perception, as well as a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for improved systems and methods for providing underwater depth perception.

With respect to some embodiments, a system is provided that includes at least one computing device configured to provide improved ways for providing underwater depth perception. And, with respect to some embodiments, a method, such as one of the aforesaid methods, is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

The systems and methods described herein overcome some technical problems in providing underwater depth perception. Also, the techniques disclosed herein provide specific technical solutions to at least overcome the technical problems mentioned in the background section or other parts of the application as well as other technical problems not described herein but recognized by those skilled in the art.

These and other important aspects of the invention are described more fully in the detailed description below. The invention is not limited to the particular methods and systems described herein. Other embodiments can be used and changes to the described embodiments can be made without departing from the scope of the claims that follow the detailed description.

Within the scope of this application, it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The present disclosure will be understood more fully from the detailed description given below and from the accompanying drawings of various embodiments of the disclosure.

Embodiments of the invention will now be described, by way of example, with reference to the accompanying drawings, in which:

FIGS. 5 to 9 illustrate methods in accordance with some embodiments of the present disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications, and equivalents as will become apparent from consideration of the following detailed description and other parts of this disclosure.

Disclosed herein are novel technologies for underwater depth perception. The technologies can include systems and methods for underwater depth perception. For example, embodiments of the technologies can include systems using either multiple image sensors or one image sensor and a complementary sensor to provide underwater depth perception. The systems can also include a computing system that provides the underwater depth perception based on data sensed by the multiple image sensors or the one image sensor and the complementary sensor. The systems can also include a submersible device (such as a submersible mobile machine) that includes a holder configured to hold the one image sensor. The holder can be configured to hold the computing system in addition to the one image sensor. And, in some embodiments, the holder is configured to hold the complementary sensor in addition to the computing system and the one image sensor. Alternatively, in some embodiments, the holder is configured to hold the multiple image sensors. And, the holder can be configured to hold the computing system in addition to the multiple image sensors.

Figure 1:
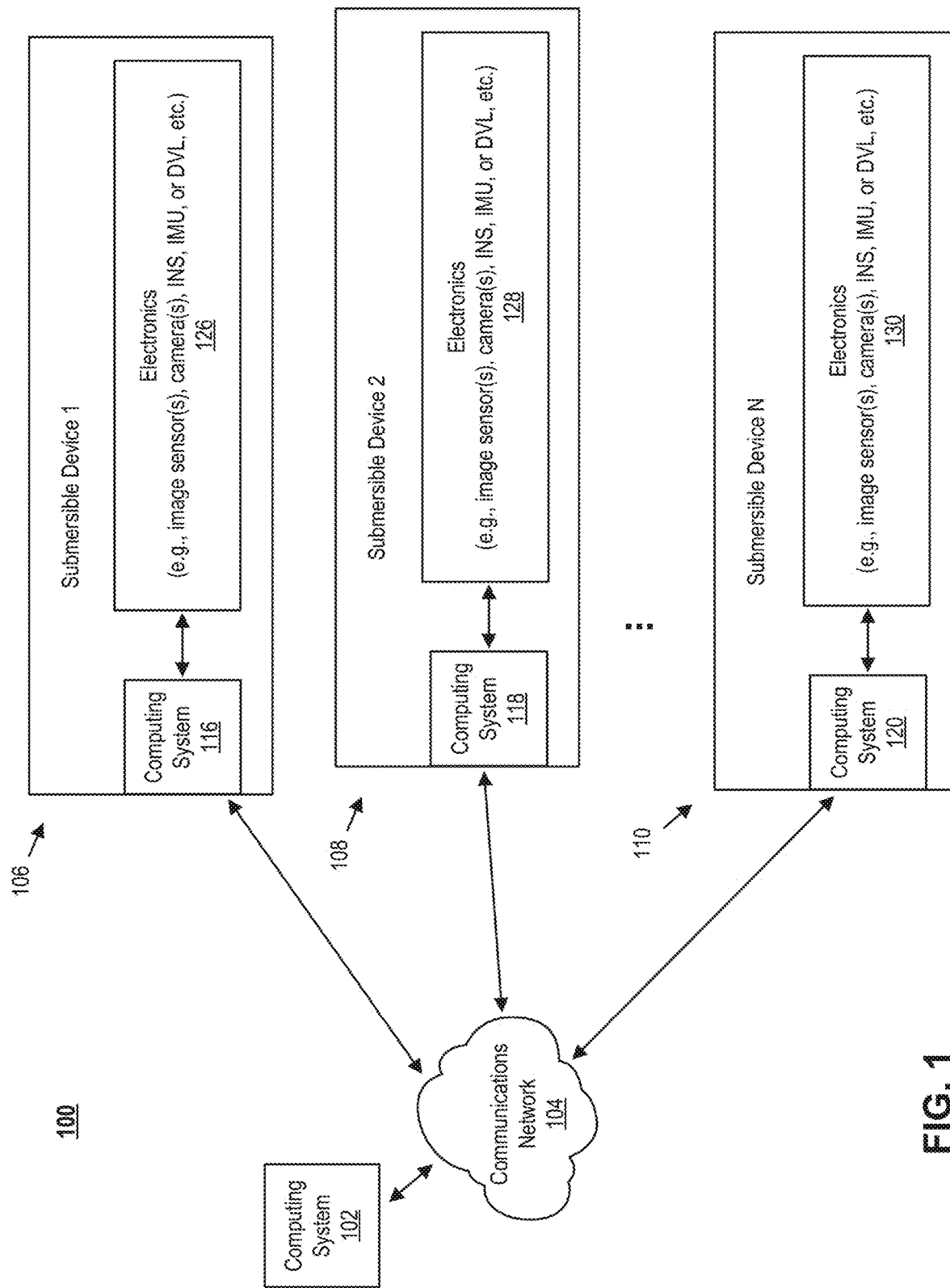
FIG. 1 illustrates an example network of submersible devices that communicate with a computing system through a communication network, in accordance with some embodiments of the present disclosure.

FIG. 1 illustrates a network 100 of submersible devices (e.g., see devices 106, 108, and 110) and computing systems (e.g., see systems 102, 116, 118, and 120) that can communicate through a communications network 104. The network 100 or at least a part of it (depending on the embodiment) is in accordance with some embodiments of the present disclosure. The computing system 102 can be a remote computing system in that it is physically and geographically separated from the submersible devices of the network 100 in some embodiments. The submersible devices are shown communicating with the computing system 102 of the network 100 through a communications network 104. As shown in FIG. 1, the submersible devices of the network 100 can each include its computing system including electronics such as one or more connected sensors, cameras, busses, and computers (e.g., see computing systems 116, 118, and 120, and see electronics 126, 128, and 130).

A computing system of a submersible device of the network 100 or any other submersible device disclosed herein can include a processor, memory, a communication interface, and one or more sensors that can make the computing system individual computing devices. In the case of the communications network 104 including the Internet, the submersible devices of the network 100 are considered Internet of Things (IoT) devices. Also, in some embodiments, the computing system 102 is a part of a cloud computing system.

As shown in FIG. 1, each one of the submersible devices includes a respective computer and respective electronics (e.g., see computing systems 116, 118, and 120, and see electronics 126, 128, and 130). In some embodiments, electronics of a submersible device disclosed herein include electronic hardware and software of the device such as sensors and other types of electrical and/or mechanical feedback devices that are communicatively coupled with the computer of the device. And, in some embodiments, the computer of the submersible device is configured to connect or integrate with its electronics (e.g., see electronics 126, 128, and 130) and communicate with a computing system that is not within the device (such as the computing system 102) via the communications network 104 and its local computing system (e.g., see systems 116, 118, and 120). In some embodiments, the electronics of the submersible device can include one or more image sensors, one or more cameras, an IMU device, a pressure sensor, an FLS device, a DVL device, a USBL device, an INS device, or the like, or a combination thereof.

In some embodiments, the submersible device can include a camera. In some embodiments, the camera can be replaced with another type of sensor that can capture data points (such as enough data points to provide an image) of an area near the device. For example, in some embodiments, LIDAR attached to the device captures data points or an image of an area in front of the machine and the computing system processes such data points or the image to perform depth perception. In some embodiments, the data points captured by the LIDAR are converted into an image for processing to perform depth perception. Also, in some embodiments, CMOS or CCD image sensors attached to the device can capture data points or an image of an area in front of the machine and the computing system processes such data points or the image to perform depth perception. In some other embodiments, the camera can be an RGB camera or a grayscale camera, a CMYK camera, or any other type of camera having a different color mode than RGB, grayscale, or CMYK. And, regardless of the type of camera, the captured images of the camera can be processed by the computing system using depth perception techniques. Also, in some embodiments, the computing system includes a GPU.

In some embodiments, the submersible device (e.g., see submersible device 106, 108, or 110) includes a submersible mobile machine, a submersible robot, a submersible vehicle or a submersible craft, a submarine, or a submersible. In some of such embodiments, the submersible device can be or include a vehicle that is self-propelling. Also, in some embodiments, the device can be a part of a group of similar devices connected through a network (e.g., see submersible devices 106, 108, and 110).

The communications network 104 includes one or more local area networks (LAN(s)) and/or one or more wide area networks (WAN(s)). In some embodiments, the communications network 104 includes the Internet and/or any other type of interconnected communications network. The communications network 104 can also include a single computer network or a telecommunications network. More specifically, in some embodiments, the communications network 104 includes a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

At least each shown component of the network 100 (including computing system 102, communications network 104, and devices 106, 108, and 110) can be or include a computing system that includes memory that includes media. The media includes or is volatile memory components, non-volatile memory components, or a combination thereof. In general, in some embodiments, each of the computing systems includes a host system that uses memory. For example, the host system writes data to the memory and reads data from the memory. The host system is a computing device that includes a memory and a data processing device. The host system includes or is coupled to the memory so that the host system reads data from or writes data to the memory. The host system is coupled to the memory via a physical host interface. The physical host interface provides an interface for passing control, address, data, and other signals between the memory and the host system.

Figure 2:
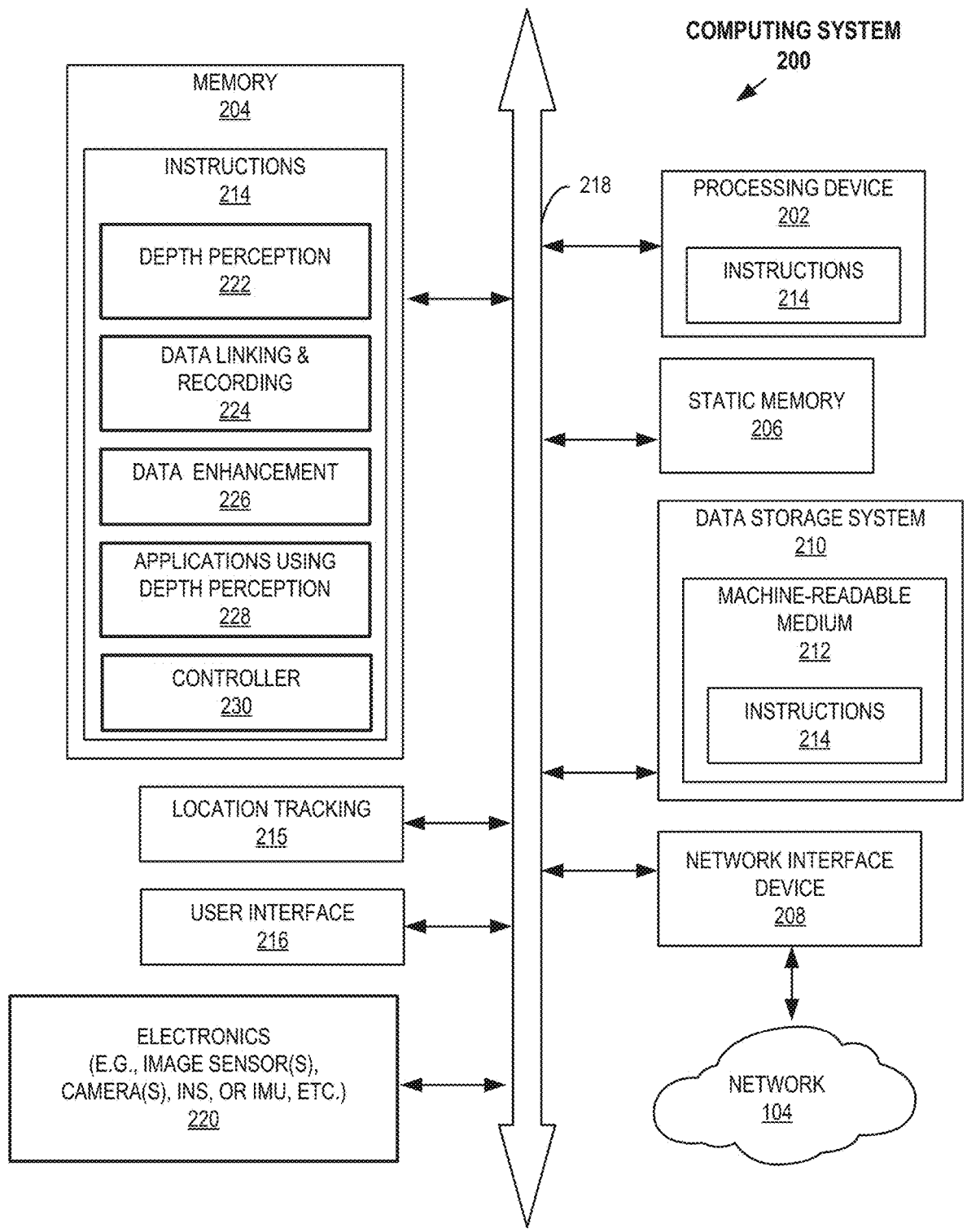
FIG. 2 illustrates a block diagram of example aspects of a computing system (such as one of the computing systems shown in FIG. 1), in accordance with some embodiments of the present disclosure.

FIG. 2 illustrates a block diagram of example aspects of a computing system 200. In some embodiments, the computing system 200 is a part of a submersible device such as any of the example submersible devices described herein (e.g., see devices 106, 108, and 110 shown in FIG. 1). In some embodiments, the computing system 200 is local to the submersible device (e.g., see computing systems 116, 118, and 120). In some alternative embodiments, the computing system can include a remote computing system (e.g., computing system 102 can be a remote computing system in some embodiments), wherein the remote computing system can be the sole computing system of the submersible device in some examples or in combination with a local computing system of the submersible device in some other examples. And, in some other examples, no remote computing system is used for the providing of the depth perception and only a local system of the submersible device is used for the depth perception functionality of the device.

Figure 5:
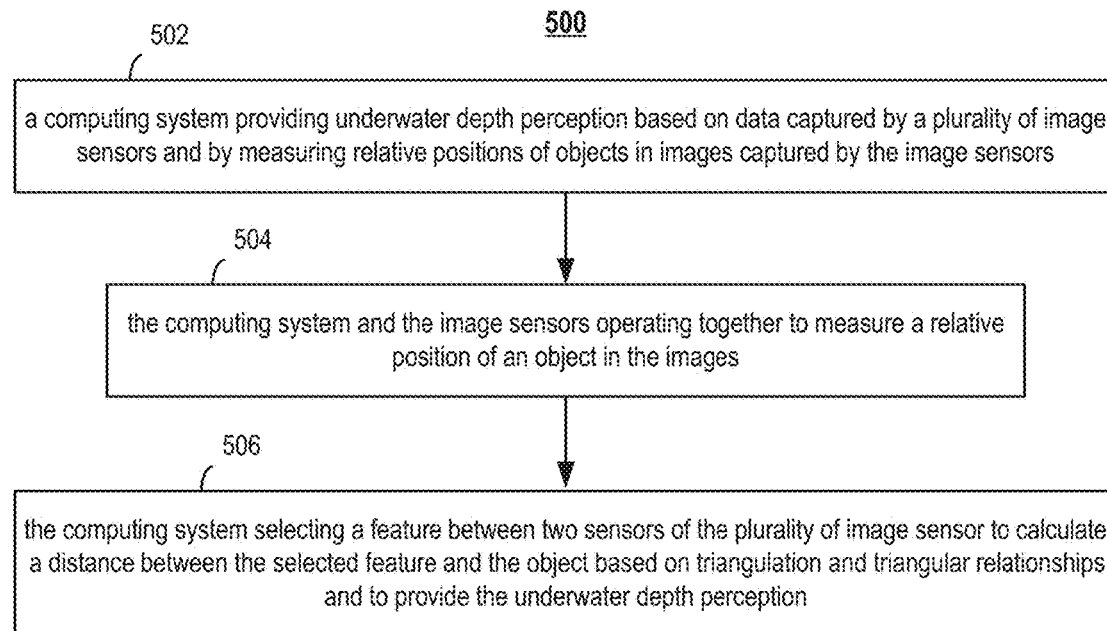

FIG. 2 illustrates parts of the computing system 200 within which a set of instructions, for causing a machine (such as a computer processor or processing device 202) to perform any one or more of the methodologies discussed herein performed by a computing system, are executed (e.g., see the method steps of method 500 shown in FIG. 5). In some embodiments, the computing system 200 includes one or more computing devices the implement edge computing in that the device(s) are part of a distributed computing framework that brings the computing described herein closer to data sources such as the various sensors described herein including the images sensors and cameras. This proximity to data at its source can deliver improved response times and bandwidth availability. In some embodiments, the computing system 200 operates with additional computing systems (e.g., such as additional remote computing systems) to provide increased computing capacity in which multiple computing systems operate together to perform any one or more of the methodologies discussed herein that are performed by a computing system. In some embodiments, the computing system 200 corresponds to a host system that includes, is coupled to, or utilizes memory or is used to perform the operations performed by any one of the computing systems described herein. In some embodiments, the machine is connected (e.g., networked) to other machines in a LAN, an intranet, an extranet, or the Internet. In some embodiments, the machine operates in the capacity of a server in a client-server network environment, as a peer machine in a peer-to-peer (or distributed) network environment, or as a server in a cloud computing infrastructure or environment. In some embodiments, the machine is a personal computer (PC), a tablet PC, a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein performed by computing systems.

The computing system 200 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 218. The processing device 202 represents one or more general-purpose processing devices such as a microprocessor, a central processing unit, or the like. More particularly, the processing device can include a microprocessor or a processor implementing other instruction sets, or processors implementing a combination of instruction sets. Or, the processing device 202 is one or more special-purpose processing devices such as an application-specific integrated circuit (ASIC), a field programmable gate array (FPGA), a digital signal processor (DSP), a network processor, or the like. In some embodiments, the processing device 202 includes a GPU. The processing device 202 is configured to execute instructions 214 for performing the operations discussed herein performed by a computing system. In some embodiments, the computing system 200 includes a network interface device 208 to communicate over the communications network 104 shown in FIG. 1.

The data storage system 210 includes a machine-readable storage medium 212 (also known as a computer-readable medium) on which is stored one or more sets of instructions 214 or software embodying any one or more of the methodologies or functions described herein performed by a computing system. The instructions 214 also reside, completely or at least partially, within the main memory 204 or within the processing device 202 during execution thereof by the computing system 200, the main memory 204 and the processing device 202 also constituting machine-readable storage media.

In some embodiments, the instructions 214 include specific instructions to implement functionality described herein related to the methods described herein and that can correspond to any one of the computing devices, data processors, user interface devices, and I/O devices described herein related to a computing system. For example, the instructions 214 include depth perception instructions 222 (which include instructions configured to provide any of the techniques for providing the depth perception described herein), data linking and recording instructions 224 (which includes instructions configured to record and associate determined attributes of the depth perception with other attributes and parameters such as geographic location of the submersible device where the input data for determining the depth perception attributes were captured), data enhancement instructions 226 (e.g., which includes instructions for enhanced attribute determination such as instructions for a computing scheme, e.g., ANN, CNN, etc. specifically adapted for depth perception or related applications of depth perception), applications of depth perception instructions 228 (which includes any of the applications shown in FIGS. 10 to 13 and text provided herein associated with FIGS. 10 to 13, for example), and controller instructions 230 (which are configured to control parts and operations of a submersible device according to input and feedback such as including the determined attributes of the depth perception or an application using the depth perception). In some embodiments, the data enhancement instructions include different types of data analysis libraries as well different types of data processing libraries—including various mathematical and statistical modeling and operations libraries and machine learning, artificial intelligence, and deep learning libraries as well as specific libraries for ANN and CNN data processing and for training ANNs, CNNs and other types of computing schemes or systems.

While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that causes the machine to perform any one or more of the methodologies of the present disclosure performed in a computing system. The term "machine-readable storage medium" shall accordingly be taken to include solid-state memories, optical media, or magnetic media.

Also, as shown, the computing system 200 includes user interface 216 that includes a display, in some embodiments, and, for example, implements functionality corresponding to any one of the user interface devices disclosed herein. A user interface, such as user interface 216, or a user interface device described herein includes any space or equipment where interactions between humans and machines occur. A user interface described herein allows operation and control of the machine from a human user, while the machine simultaneously provides feedback information to the user. Examples of a user interface (UI), or user interface device include the interactive aspects of computer operating systems (such as graphical user interfaces), machinery operator controls, and process controls. A UI described herein includes one or more layers, including a human-machine interface (HMI) that interfaces machines with physical input hardware and output hardware.

Also, as shown, the computing system 200 includes submersible device electronics 220 that includes one or more sensors, cameras, other types of electrical or mechanical feedback devices, and any other type of computer hardware and software configured to interface and communicatively couple to operational components of a submersible device (e.g., see electronics 126, 128, and 130 shown in FIG. 1). In some embodiments, the electronics 220 includes controller hardware that can operate in combination with controller instructions 230. Also, in some embodiments, the electronics 220 as well as the electronics 126, 128, and 130 include any one of the cameras described herein for capturing images underwater.

In some systems of the technologies disclosed herein, any steps of embodiments of the methods described herein are implementable by executing instructions corresponding to the steps, which are stored in memory (e.g., see instructions 214, 222, 224, 226, 228, and 230 shown in FIG. 2).

As mentioned herein, some embodiments include systems configured to provide underwater depth perception. The systems can include systems using either multiple image sensors (e.g., see system 300 shown in FIG. 3) or one image sensor and a complementary sensor (e.g., see system 400 shown in FIG. 4), or even some combination thereof (not depicted). Also, the systems can include a computing system that provides the underwater depth perception based on data sensed by the multiple image sensors, or the one image sensor and the complementary sensor, or even a combination thereof. The systems can include a submersible device (such as a submersible mobile machine) that includes a holder configured to hold the one image sensor (e.g., see system 400). The holder can be configured to hold the computing system in addition to the one image sensor (e.g., wherein system 400 includes a holder that can be configured to hold a computing system or not—depending on the embodiment). And, in some embodiments, the holder is configured to hold the complementary sensor in addition to the computing system and the one image sensor (e.g., wherein system 400 includes a holder that can be configured to hold a computing system and a complementary sensor or not—depending on the embodiment). Alternatively, in some embodiments, the holder is configured to hold the multiple image sensors (e.g., see system 300). And, the holder can be configured to hold the computing system in addition to the multiple image sensors (e.g., wherein system 300 includes a holder that can be configured to hold a computing system or not—depending on the embodiment).

In some embodiments, the technologies described herein can provide underwater depth perception for real-time navigation and robotics applications (e.g., see FIG. 13 and the related text provided herein) as well as for image enhancement purposes. Observing the underwater environment using a multitude of diverse sensor types is a critical requirement of any subsea vehicle or robot traversing the oceans. Historically such platforms have relied on simple cameras, sonar-based sensors, and navigation sensors, to explore the environment. One example aspect of sensing is measuring the vehicle's position relative to objects in the environment to avoid collisions (seabed, structures, rocks, etc.) or navigate closely to underwater infrastructure during an inspection. Typically, the determination of this relative position has come from sonar or laser-based sensors, which omit sound or light pulses to measure distance by the time it takes a pulse to return to the sensor. Such sensors include multibeam sonar, forward-looking sonar, and LiDAR, most of which provide real-time feedback for the human pilot, or autonomous controller, to navigate and interpret the surroundings. Video Cameras are often used on these platforms to provide visual feedback, but they cannot estimate relative position and depth. Whereas the technologies described herein do have the ability to estimate relative position and depth via depth perception. In some cases, the relative position to objects and depth is observed via an image that is enhanced by the depth perception described herein. In some cases, a stereo camera can be used with a computing system to measure the relative position of the observed objects using triangulation, matching a feature between a set of calibrated cameras to calculate its distance. Also, the measurements can occur underwater and onboard the submersible device in real time with some embodiments described herein. The onboard and real-time capabilities are made possible through the maps or models described herein that speed and assist in the processing of data for the applications using the depth perception. For example, depth maps provide the relative position of the camera to perceive points in the image. This provides relative position at a single point in time when the image pair was captured. A computing system described herein can combine a sequence of depth maps or models to determine movement of the camera in a subsea environment. Also, the computing system can combine the depth maps or models into a 3D reconstruction of the subsea environment. In other words, the technologies described herein can enhance applications that use simultaneous localization and mapping (SLAM).

In some embodiments, underwater optical sensing where high-resolution depth maps are generated onboard the camera in real-time (or semi-real-time) to provide immediate use of the relative position data for subsea robotics perception tasks and other subsea applications. In some of the embodiments, an underwater stereo camera, or set of cameras, in an enclosed housing or housings, combined with a computer at the same location provides the aforementioned functionality. Also, an image processing pipeline using the aforesaid hardware can process sets of images in real-time using an onboard computer into a high-resolution depth map, or 3D point cloud, that represents the view of the camera in 3D.

Alternatively, similar functionality can be provided by an underwater monocular camera with a computing element inside the camera housing or not, with external navigation data input (position, time, etc.) from a sensor that defines the movement of the camera. An image processing pipeline using the hardware can use sequential images from the single camera at two positions and the additional sensor data to define an artificial stereo baseline (set of position-defined virtual cameras), to generate a high-resolution depth map, or 3D point cloud, that represents the view of the single camera in 3D.

In some embodiments, a high-resolution depth map or model includes a high density of pixels or data points from images or the like captured by an image sensor or another type of sensor. In the case of capturing images, high resolution can equate to having more than 512×512 pixels in an image for example. Higher resolution provides more fine-depth information. In some embodiments, the system can process 1024×1024 resolution at 5 fps. In some examples, the system can process images even more efficiently.

In some embodiments, the generated depth map includes an image where each pixel represents a distance to the object viewed in front of a camera or image sensor. In some cases, it is generated from a set of images with known relative positions. In some examples, the depth map includes a recording of the length of each ray projecting from each pixel location in the image relative to a camera focal point. The x-y position can be found by using the camera intrinsic calibration to calculate the ray length angles corresponding to each pixel.

In some embodiments, the generated 3D point cloud includes an interchangeable data format with a depth map, to provide a different representation of the 3D information. The point cloud can include a set of data points representing the object viewed in front of a camera or image sensor, each with a position (x, y, z) and metadata (e.g., intensity, color, quality, etc.). In some cases, it is generated from a set of images with known relative positions.

For the purposes of this disclosure, it is to be understood that the use of the term "onboard" refers to being available or situated on a vehicle or another type of mobile machine (such as a mobile robot). In some examples of the technologies disclosed herein, onboard computing can occur via a computing system within a housing of the submersible device. To increase the speed of processing even further and improve real-time computing as well as for other technical benefits, the onboard computing can occur within a housing of the image sensor or the camera of one of the systems described herein. Also, in some examples of the technologies disclosed herein, computing can occur on the edge in that the computing occurs at the source of the data generation.

Also, for the purposes of this disclosure, it is to be understood that the use of the term "real-time" refers to in which results, feedback, or data follow input with no noticeable delay. And, for the purposes of this disclosure, it is to be understood that the use of the term "real time" refers to the actual time during which a process or event occurs. In some examples of the technologies disclosed herein, depth information can be operated upon in a continuous processing pipeline beginning at the time of image capture. Such a pipeline can run without saving the data to a hard drive and without processing the data with delay after retrieving the data from the hard drive; and thus, the embodiments using the pipelines described herein can include real-time computing by avoiding the aforementioned delay associated with storing data to and retrieving data from a hard drive.

Figure 3:
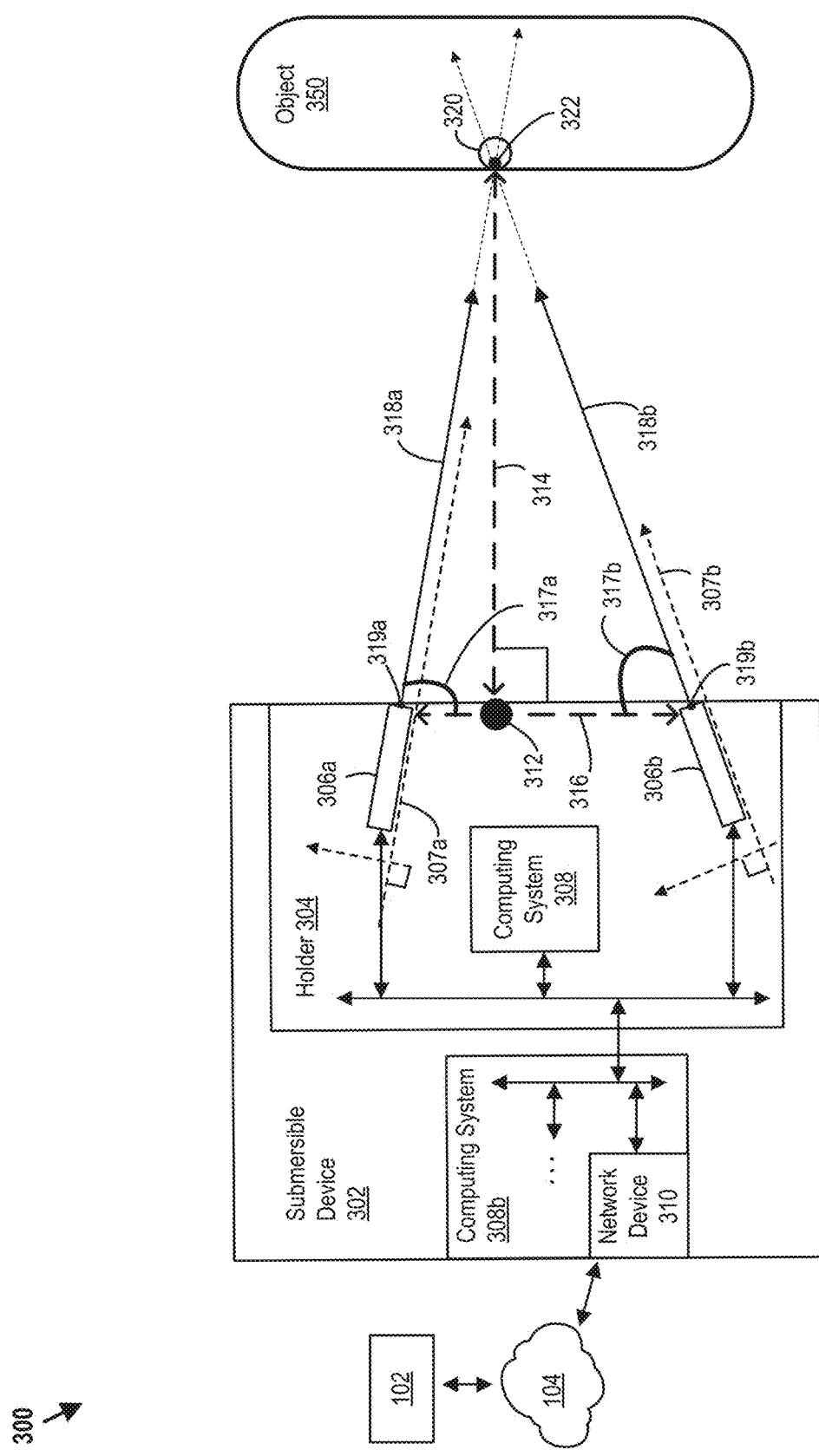
FIGS. 3 and 4 illustrate systems in accordance with some embodiments of the present disclosure.
Figure 4:
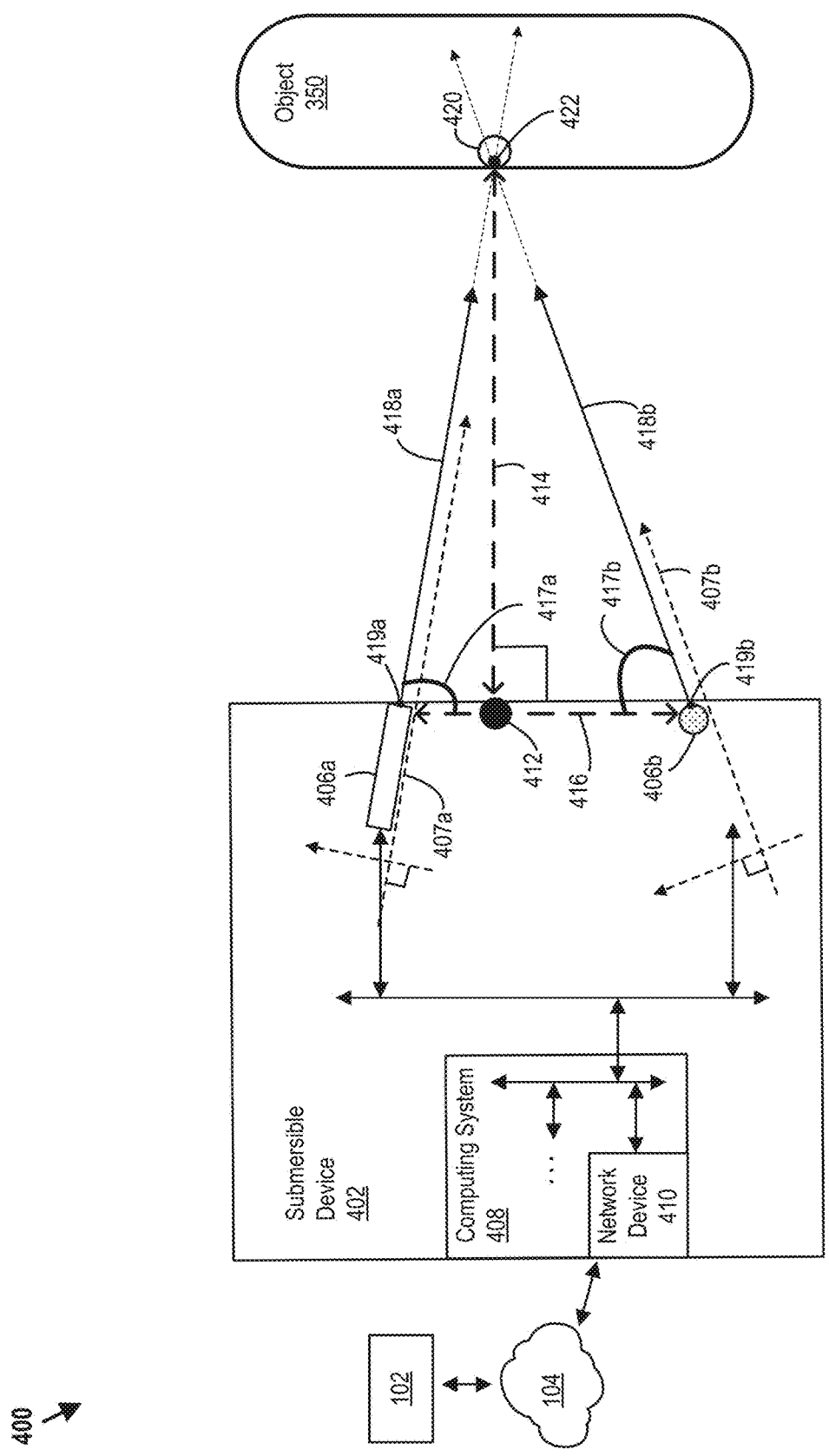

FIGS. 3 and 4 illustrate systems 300 and 400, respectively, in accordance with some embodiments of the present disclosure. Specifically, FIG. 3 illustrates the system 300 which is configured for underwater depth perception by way of multiple image sensors that are onboard the submersible device 302 of the system. FIG. 4 specifically illustrates the system 400 which is configured for underwater depth perception by way of one image sensor and a complementary sensor that are onboard the submersible device 402 of the system.

As shown in FIG. 3, the system 300 includes a submersible device 302, a holder 304, a pair of image sensors 306a and 306b, and a computing system 308 (e.g., see computing system 200). As shown, each image sensor of the pair of the sensors (e.g., see image sensor 306a or 306b) is arranged on a different axis from the other image sensor of the pair (e.g., see axis 307a and axis 307b). Each one of the image sensors is configured to complement the other, and each one of the image sensors includes any type of sensor that captures an image based on reflected or emitted electromagnetic radiation or mechanical waves, depending on the embodiment. For example, the pair of image sensors can be a pair of cameras or a pair of image sensors in a stereo camera. The computing system 308 is configured to provide underwater depth perception based on data captured by the pair of image sensors 306a and 306b. The submersible device 302 includes the holder 304, and the holder 304 is configured to hold the pair of image sensors 306a and 306b and the computing system 308. In some cases, the system 300 can include the network (e.g., see network 104 shown in FIG. 1) that facilitates the communications between the device 302 and other devices or systems (e.g., see system 102). In some cases, the system 300 can include the other devices or systems.

At least some of the computing by the computing system 308 to provide underwater depth perception occurs onboard the submersible device 302. In some embodiments, all the computing for the depth perception occurs through the computing system 308. In some other embodiments, the majority of the computing for the depth perception occurs through the computing system 308. In some embodiments, less than the majority of the computing for the depth perception occurs through the system 308. In some embodiments, where the majority or less of the computing for the depth perception occurs through the system 308, the remainder of the computing for the depth perception can occur through a second computing system 308b that is onboard the device 302 or through a remote computing system (e.g., see computing system 102, which can be a remote system is some examples). When communicating with the remote computing system, the device 302 can access the remote system via the computing system 308 held by the holder 304 or the second computing system 308b, or a combination thereof. For instance, communications with the remote system can occur via a network device 310 of the second computing system 308b or a network device of the system 308 (not depicted), and the communications can be transmitted across a network to the remote system (e.g., see network 104 and computing system 102 shown in FIGS. 1 and 3).

As shown, in some embodiments, the computing system 308 and the image sensors 306a and 306b are configured to operate together to measure a relative position of an object (e.g., see object 350) in images captured by the image sensors to provide the underwater depth perception. In some examples, the computing system 308 is configured to select a feature 312 between image sensors 306a and 306b to calculate a distance 314 between the selected feature 312 and the object 350 and to provide the underwater depth perception. In some cases, the computing system 308 is configured to perform the measurement of the relative position of the object 350 in the images using triangulation. For example, the computing system 308 can be configured to perform the triangulation where it is based on respective observations of the object by the image sensors 306a and 306b, a known distance between the two image sensors that defines a base 316, and respective angles 317a and 317b between the base and respective rays 318a and 318b corresponding to the respective observations of the object 350. In some examples, the two sensors 306a and 306b are configured to observe the object 350 according to respective rays 318a and 318b beginning at respective starting points at the two sensors (e.g., see starting points 319a and 319b) and extending towards a selected point on a surface of the object (e.g., see selected point 320). In such examples, the computing system 308 is configured to use the respective starting points of the and the selected point on the surface of the object to define a spatial triangle for the triangulation. In some cases, the computing system 308 is configured to use the known distance between the two sensors as a base of the spatial triangle (e.g., see base 316) and determine angles between the base and the respective rays corresponding to the respective observations of the object (e.g., see angles 317a and 317b). And, in such cases, the computing system uses the determined angles to determine the intersection point 322 of the respective rays to provide a spatial coordinate of the selected point 320 on the surface of the object 350 according to triangular relations as well as uses triangular relations to determine the distance between the selected feature and the point on the surface of the object (e.g., see distance 314) and to provide the underwater depth perception.

As shown in FIG. 4, in an alternative embodiment of the system (e.g., see system 400), the system includes a submersible device 402 that is somewhat similar to the device shown in FIG. 3, but it may not include a holder similar to the holder of device 302, and thus, the computing system 408 of the device 402 may or may not be held by such a holder. Also, not having such a holder, the device 402 may not include a pair of image sensors. As shown, submersible device 402 does include at least one image sensor (e.g., see image sensor 406a). However, the second image sensor, which is a part of the embodiment of the submersible device 302 is replaced by a virtual position 406b sensed by any type of sensor or device that can sense and approximate a relative position of itself. As shown, the image sensor 406a and the virtual position 406b become essentially two virtual positions or essentially the equivalent of a pair of image sensors since virtual rays or line of sights can be calculated from the virtual position 406b. The computing system can be configured to arrange the image sensor 406a and the virtual position 406b on different axes (e.g., see axis 407a and axis 407b). Each one of the image sensor 406a and the virtual position 406b is configured to complement the other. The computing system 408 is configured to provide underwater depth perception based on data captured by the pairing of the image sensor 406a and the virtual position 406b. In some cases, the system 400 can include the network (e.g., see network 104 shown in FIG. 1) that facilitates the communications between the device 402 and other devices or systems (e.g., see system 102). In some cases, the system 400 can include the other devices or systems.

At least some of the computing by the computing system 408 to provide underwater depth perception occurs onboard the submersible device 402. In some embodiments, all the computing for the depth perception occurs through the computing system 408. In some other embodiments, the majority of the computing for the depth perception occurs through the computing system 408. In some embodiments, less than the majority of the computing for the depth perception occurs through the system 408. In some embodiments, where the majority or less of the computing for the depth perception occurs through the system 408, the remainder of the computing for the depth perception can occur through a remote computing system (e.g., see computing system 102, which can be a remote system is some examples). When communicating with the remote computing system, the device 402 can access the remote system via the computing system 408. For instance, communications with the remote system can occur via a network device 410 of the computing system 408, and the communications can be transmitted across a network to the remote system (e.g., see network 104 and computing system 102 shown in FIGS. 1 and 4).

As shown, in some embodiments, the computing system 408, the image sensor 406a, and the complementary sensor that produce the virtual position 406b are configured to operate together to measure a relative position of an object (e.g., see object 350) in an image captured by the image sensor to provide the underwater depth perception. In some examples, the computing system 408 is configured to select a feature 412 between the image sensor 406a and the virtual position 406b to calculate a distance 414 between the selected feature 412 and the object 350 and to provide the underwater depth perception. In some cases, the computing system 408 is configured to perform the measurement of the relative position of the object 350 in the image using triangulation. For example, the computing system 408 can be configured to perform the triangulation where it is based on an actual observation of the object by the image sensors 406a and a virtual observation of the position 406b such as if the position was representative of an image sensor. The triangulation can also be performed by the system 408 based on a known distance between the image sensor 406a and the virtual position 406b that defines a base 416, and respective angles 417a and 417b between the base and respective rays 418a and 418b corresponding to the observation of the object 350 by the image sensor and the virtual observation by the virtual position. In some examples, the image sensor 406a and the virtual position 406b are configured to observe the object 350 according to the respective rays 418a and 418b beginning at respective starting points of the two components (e.g., see starting points 419a and 419b) and extending towards a selected point on a surface of the object (e.g., see selected point 420). In such examples, the computing system 408 is configured to use the respective starting points of the and the selected point on the surface of the object to define a spatial triangle for the triangulation. In some cases, the computing system 408 is configured to use the known distance between the two components as a base of the spatial triangle (e.g., see base 416) and determine angles between the base and the respective rays corresponding to the respective observations of the object (e.g., see angles 417a and 417b). And, in such cases, the computing system uses the determined angles to determine the intersection point 422 of the respective rays to provide a spatial coordinate of the selected point 420 on the surface of the object 350 according to triangular relations as well as uses triangular relations to determine the distance between the selected feature and the point on the surface of the object (e.g., see distance 414) and to provide the underwater depth perception.

With respect to either system 300 or system 400, at least one of the computing systems is configured to generate an underwater three-dimensional model based on the data captured by the two image sensors of system 300 or the image sensor and the complementary sensor that defines the virtual position that pairs with the position of the image sensor in system 400. In either case, the model includes respective distances between the selected feature of the system and objects underwater. Also, the respective distances between the selected feature and the objects underwater can include the determined distance between the selected feature and the point on the surface of the object. Also, with respect to either system 300 or system 400, at least one of the computing systems is configured to generate an underwater depth map based on the data captured by the two image sensors of system 300 or the image sensor and the complementary sensor that defines the virtual position that pairs with the position of the image sensor in system 400. In either case, the map includes respective distances between the selected feature of the system and objects underwater. Also, the respective distances between the selected feature and the objects underwater can include the determined distance between the selected feature and the point on the surface of the object.

With respect to system 300 shown in FIG. 3, it is shown that the image sensors consist of a pair of sensors that sense reflected electromagnetic energy. However, in alternative embodiments, the pair of sensors can consist of a pair of sensors that sense reflected mechanical waves or energy such as sound. Also, the system 300 can include a stereo camera that includes the pair of image sensors and that is configured to capture three-dimensional images using the image sensors. In some cases, the image sensors consist of a pair of image sensors of the camera. Some embodiments include a system that includes two separate cameras and a computing system, configured to provide underwater depth perception based on data captured by the two separate cameras and by measuring relative positions of objects in images captured by the two separate cameras. Also, in some cases, the system with two cameras further includes a submersible housing. The submersible housing can include a holder and the holder can be configured to hold the two separate cameras and the computing system, and the computing by the computing system to provide the underwater depth perception can occur inside the submersible housing.

With respect to systems 300 and 400 shown in FIGS. 3 and 4 respectively, the submersible device can include or be or be a part of a submersible mobile machine. In some cases, the submersible mobile machine includes a submersible robot. In some cases, the submersible mobile machine includes a submersible vehicle or a submersible craft. In some cases, the submersible vehicle or craft is a submarine or a submersible.

In some cases of system 300 or system 400, the paired image sensors or the paired image sensor and complementary sensor as well as the computing system are configured to operate effectively while the submersible device is completely submerged. Where such embodiments include a holder, such as holder 304, the paired image sensors or the paired image sensor and complementary sensor as well as the computing system are configured to operate effectively while the submersible device and the holder are completely submerged. Also, with respect to system 300 or system 400, the computing system is further configured to provide underwater depth perception based on raw data captured by the pair of image sensors or the paired image sensor and complementary sensor.

Also, as shown in FIG. 4, the system 400 includes an image sensor, such as a camera, e.g., see sensor 406a. In some examples, the image sensor includes or can be any type of sensor that captures an image based on reflected or emitted electromagnetic radiation or mechanical waves. The system also includes a complementary sensor (e.g., see the virtual position 406b, which defines the position of a sensor complementary to the image sensor). The sensor that is complementary to the image sensor, or the complementary sensor, is configured to complement or reinforce the image sensor by generating information analogous to the information generated by the image sensor. The complementary sensor can be, be a part of, or include a second camera, an IMU device, a pressure sensor, an FLS device, a DVL device, a USBL device, an INS device, or the like, or a combination thereof.

The system also includes a computing system (e.g., see computing system 408). The computing system is configured to provide underwater depth perception based on data sensed by the image sensor and the complementary sensor. Also, as shown in FIG. 4, the system can also include a submersible device that includes the image sensor and the complementary sensor as well as the computing system. In some embodiments, computing by the computing system to provide the underwater depth perception occurs onboard the submersible device. The computing for the underwater depth perception can occur entirely onboard the submersible device or it can occur partially onboard the device. Or, the computing for the underwater depth perception can occur remotely in that the computing occurs in a second device physically separated from the submersible device and the second device, in such cases, is connected to the submersible device via a network (e.g., see network 104).

In some embodiments, in general, the system further includes any sensor that provides position or orientation information directly and such a sensor is a part of or includes the complementary sensor. The computing system or such a sensor, in such cases, is configured to use the position or orientation information to analyze movement, position, or orientation of the image sensor to complement the data sensed by the image sensor and to generate depth perception information according to a combination of the analyzed movement, position, or orientation of the image sensor and the data sensed by the image sensor. In some examples, such a sensor can generate a virtual position (such as virtual position 406b) as a factor of the triangulation process illustrated in FIG. 4.

In some embodiments, more specifically, the system further includes an inertial measurement unit (IMU) that is part of or includes the complementary sensor and is configured to sense movement of the image sensor (e.g., the IMU sensing accelerations and orientations is some instances). The computing system or the IMU, in such cases, is configured to determine movement information associated with the image sensor based on the movement sensed by the IMU to complement the data sensed by the image sensor and to generate depth perception information according to a combination of the movement information and the data sensed by the image sensor. In some examples, the IMU can generate a virtual position (such as virtual position 406b) as a factor of the triangulation process illustrated in FIG. 4. In some examples, an underwater monocular camera with a computing element inside or outside the camera housing correlates inertial data generated from the IMU. The inertial data can include movement data of the camera such as accelerations and orientations. An image processing pipeline using such hardware utilizes sequential images from the camera, at least at two positions, and the additional inertial data to define and to generate a depth map or a three-dimensional model (e.g., a high-resolution depth map or a 3D point cloud). In some examples, the generation of the map or the model can occur in real-time onboard the submersible device.

In some embodiments, the system further includes a pressure sensor that is part of or includes the complementary sensor and is configured to sense pressure near the image sensor. The computing system or the pressure sensor, in such cases, is configured to determine water depth of the image sensor based on the pressure sensed by the pressure sensor to complement the data sensed by the image sensor and to generate depth perception information according to a combination of the water depth and the data sensed by the image sensor. In some examples, the pressure sensor can generate a virtual position (such as virtual position 406b) as a factor of the triangulation process illustrated in FIG. 4. In some instances, an underwater monocular camera, with a computing element inside or outside the camera housing, can use image data captured by the camera with depth data derived from raw data captured by a pressure sensor to define and generate vertical movement of the camera or the pressure sensor in real time. An image processing pipeline using such hardware utilizes sequential images from the camera, at least at two positions, with the additional depth data (e.g., the depth data can include change in vertical position between image captures) to define and to generate a depth map or a three-dimensional model (e.g., a high-resolution depth map or a 3D point cloud). In some examples, the generation of the map or the model can occur in real-time onboard the submersible device.

In some embodiments, the system further includes a forward-looking sonar (FLS) device that is part of or includes the complementary sensor and is configured to sense distances to objects in front of the image sensor corresponding to objects the image sensor captures in the data sensed by the image sensor. The computing system or the FLS device, in such cases, is configured to determine the distances to the objects in front of the image sensor to complement the data sensed by the image sensor and to generate depth perception information according to a combination of the distances to the objects in front of the image sensor and the data sensed by the image sensor. In some examples, the FLS device can generate a virtual position (such as virtual position 406b) as a factor of the triangulation process illustrated in FIG. 4. In some examples, an underwater monocular camera, with a computing element inside or outside the camera housing, can correlate its own captured images with distance data captured from the FLS device (which includes data points in sonar depth information). In such cases, the FLS device can provide the distances to various data points also perceived through images generated by the camera. An image processing pipeline using such hardware utilizes sequential images from the camera, at least at two positions, with the additional sonar depth information to define and to generate a depth map or a three-dimensional model (e.g., a high-resolution depth map or a 3D point cloud). In some examples, the generation of the map or the model can occur in real-time onboard the submersible device.

In some embodiments, the system further includes a Doppler velocity log (DVL) device that is part of or includes the complementary sensor. The computing system or the DVL device, in such cases, is configured to use velocity information sensed by the DVL device to analyze movement of the image sensor to complement the data sensed by the image sensor and to generate depth perception information according to a combination of the analyzed movement of the image sensor and the data sensed by the image sensor. In some examples, the DVL device can generate a virtual position (such as virtual position 406b) as a factor of the triangulation process illustrated in FIG. 4. In some instances, an underwater monocular camera, with a computing element inside or outside the camera housing, can correlate its own captured images with velocity data captured from the DVL device (which includes velocity information about the motion of the camera). An image processing pipeline using such hardware utilizes sequential images from the camera, at least at two positions, with the additional velocity data to define and to generate a depth map or a three-dimensional model (e.g., a high-resolution depth map or a 3D point cloud). In some examples, the generation of the map or the model can occur in real-time onboard the submersible device.

In some embodiments, the system further includes an ultra-short baseline (USBL) device or an inertial navigation system (INS) device that is part of or includes the complementary sensor. The computing system or the USBL or INS device, in such cases, is configured to use position or orientation information sensed by the USBL or INS device to analyze movement, position, or orientation of the image sensor to complement the data sensed by the image sensor and to generate depth perception information according to a combination of the analyzed movement, position, or orientation of the image sensor and the data sensed by the image sensor. In some examples, the USBL or INS device can generate a virtual position (such as virtual position 406b) as a factor of the triangulation process illustrated in FIG. 4.

FIGS. 5 to 9 illustrate methods in accordance with some embodiments of the present disclosure. Methods 500 to 900 of FIGS. 5 to 9 respectively are performed by any one of the electronics and any one of the computing systems described herein (e.g., see computing system 200 and electronics 220). Methods 500 to 900 are alternative embodiments; however, aspects of the methods can be combined to make a greater or more specific method. And, such a combination is to be considered part of this disclosure.

As shown in FIG. 5, method 500 begins with step 502, which includes a computing system providing underwater depth perception based on data captured by a plurality of image sensors and by measuring relative positions of objects in images captured by the image sensors. In some embodiments, the computing system includes a GPU. In some cases, the computing system and the image sensors can be held by a holder of a submersible device. And, in some examples, computing by the computing system to provide the underwater depth perception occurs onboard the submersible device. At step 504, the method 500 continues with the computing system and the image sensors operating together to measure a relative position of an object in the images. At step 506, the method 500 continues with the computing system selecting a feature between two sensors of the plurality of image sensors to calculate a distance between the selected feature and the object based on triangulation and triangular relationships and to provide the underwater depth perception. In some cases, each one of the image sensors includes any type of sensor that captures an image based on reflected or emitted electromagnetic radiation or mechanical waves.

Figure 6:
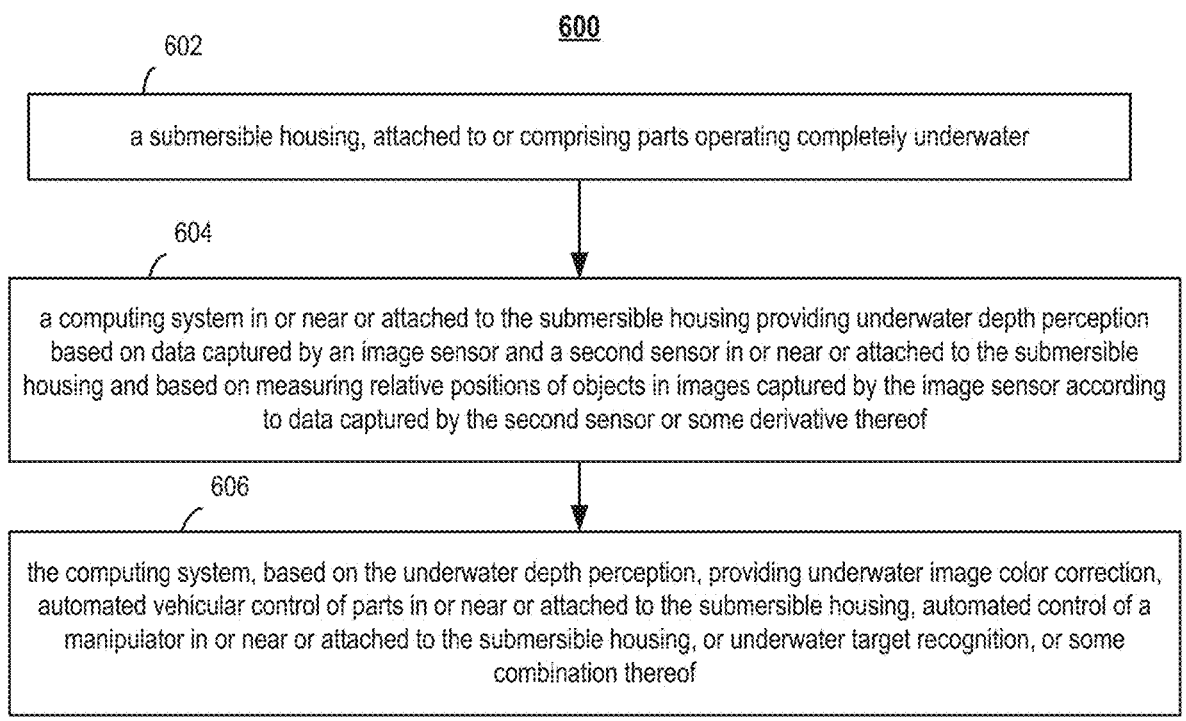

As shown in FIG. 6, method 600 begins with step 602, which includes a submersible housing, attached to or including parts operating completely underwater. At step 604, the method 600 continues with a computing system in or near or attached to the submersible housing providing underwater depth perception based on data captured by an image sensor and a second sensor in or near or attached to the submersible housing and based on measuring relative positions of objects in images captured by the image sensor according to data captured by the second sensor or some derivative thereof. In some examples, the image sensor includes any type of sensor that captures an image based on reflected or emitted electromagnetic radiation or mechanical waves. At step 606, the method 600 continues with the computing system, based on the underwater depth perception, providing underwater image color correction, automated vehicular control of parts in or near or attached to the submersible housing, automated control of a manipulator in or near or attached to the submersible housing, or underwater target recognition, or some combination thereof.

Figure 7:
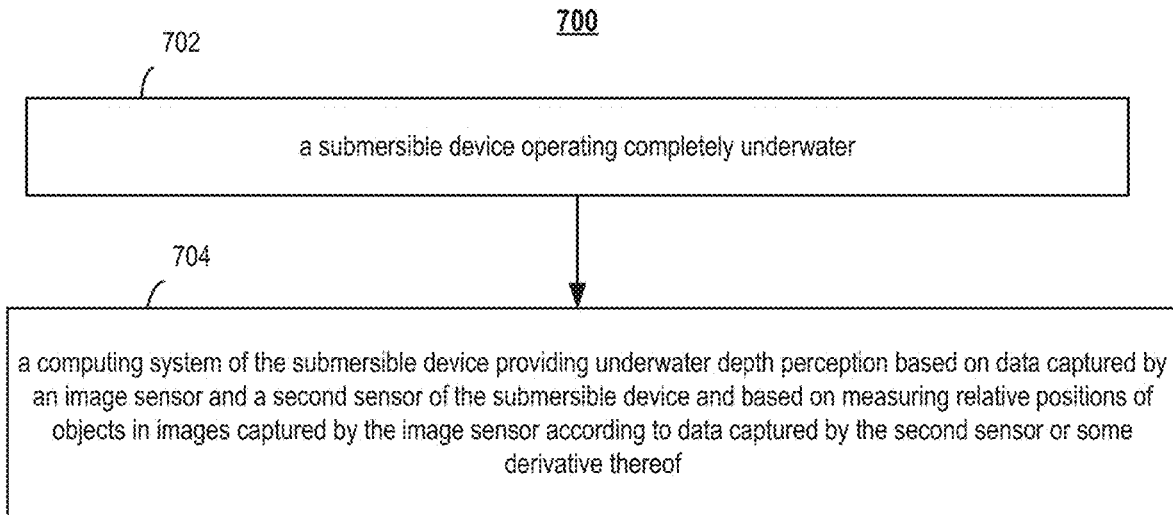
Figure 8:
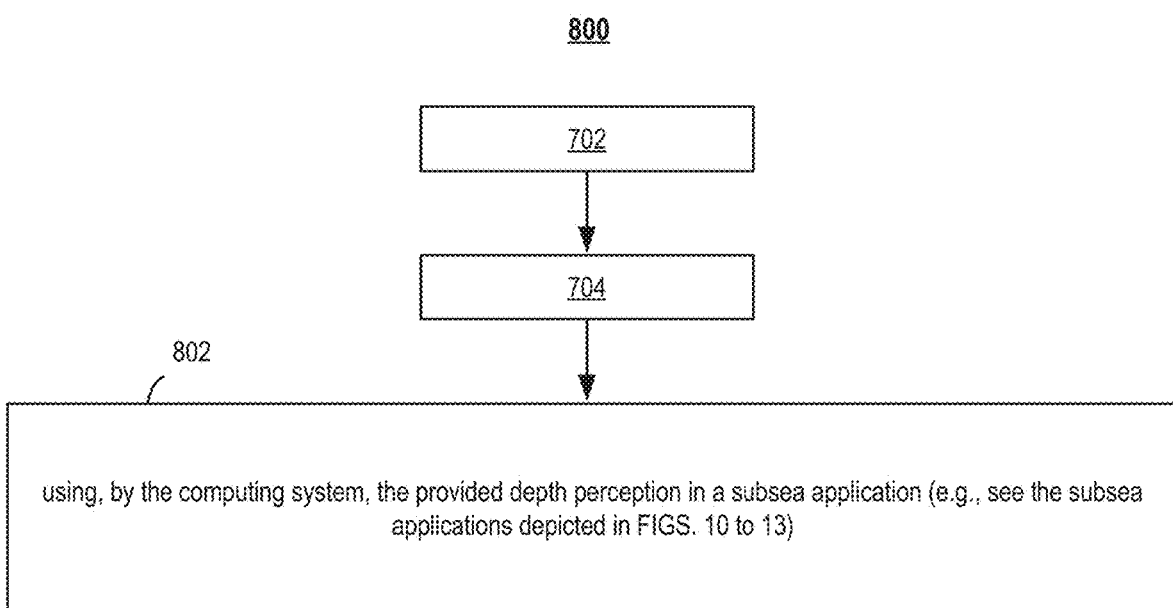

As shown in FIG. 7, method 700 begins with step 702, which includes a submersible device operating completely underwater. At step 704, the method 700 continues with a computing system of the submersible device providing underwater depth perception based on data captured by an image sensor and a second sensor of the submersible device and based on measuring relative positions of objects in images captured by the image sensor according to data captured by the second sensor or some derivative thereof. In some instances, the second sensor is part of or includes an IMU, a pressure sensor, an FLS device, or a DVL device, or any combination thereof. And, in some cases, the image sensor includes any type of sensor that captures an image based on reflected or emitted electromagnetic radiation or mechanical waves. Also, as shown in FIG. 8, method 800 begins with step 702 and continues with step 704. And, furthermore, method 800 continues with step 802, which includes using, by the computing system, the provided depth perception in a subsea application (e.g., see the subsea applications depicted in FIGS. 10 to 13).

In some embodiments of the aforementioned methods as well as other methodologies described herein, the providing of depth perception or some of the corresponding calculations can occur through a scheme or computing model (e.g., see computing scheme 907). Also, in some embodiments, the providing of depth perception or some of the corresponding calculations is based at least on a computer vision analysis (e.g., see steps 904 to 908 shown in FIG. 9 as well as data enhancement instructions 226 shown in FIG. 2). Further, in some of such examples, the providing of depth perception or some of the corresponding calculations is further based on digital signal processing in addition to the computer vision analysis (e.g., see all the steps of FIG. 9 as well as instructions 226). As shown in FIG. 9, in some examples, the digital signal processing (such as at step 902) occurs prior to the computer vision analysis as a pre-processing step to generate enhanced input for the computer vision analysis (such as the analysis at step 906 by computing scheme 907). In some embodiments, as shown in FIG. 9, the providing of depth perception or some of the corresponding calculations includes, at step 906, processing, by the computing scheme 907, at least some of the inputs of the providing of depth perception or some of the corresponding calculations or the enhanced input of step 902. For example, inputs can be based on digital signal processing at step 902. In some embodiments, the method includes inputting the enhanced input from the signal processing into an artificial neural network (ANN), e.g., see step 904, and the computer vision analysis includes inputting the enhanced input into an ANN (e.g., see step 904 as well as instructions 226). And, the providing of depth perception or some of the corresponding calculations is based at least on the output of the ANN (e.g., see step 908). In some cases, as shown in FIG. 9, at step 908, the providing of depth perception or some of the corresponding calculations continues with using an output of the computing scheme 907 or a derivative thereof to further provide the depth perception or some of the corresponding calculations. In some examples, the ANN includes or is part of a deep learning process (e.g., see instructions 226). Also, in some examples, the deep learning process includes a convolutional neural network (CNN) (e.g., see instructions 226). Also, in some examples, the deep learning process includes a network of convolutional neural networks (CNNs) (e.g., see instructions 226).

In some embodiments, the computer vision analysis includes inputting aspects of the images or derivatives of aspects of the images into an ANN (e.g., see scheme 907), and the providing of depth perception or some of the corresponding calculations is based at least on output of the ANN. In some examples, the ANN includes or is part of a deep learning process that determines attributes for providing depth perception or some of the corresponding calculations. Also, in some examples, the deep learning process includes a CNN. And, the deep learning process can include a network of CNNs and the CNN is one of multiple CNNs of the network. In some embodiments, the implementation of the aforesaid computing schemes or computer vision analysis can be performed by executing instructions 226.

FIGS. 10 to 13 illustrate applications of depth perception in accordance with some embodiments of the present disclosure. In some embodiments, the computing system is further configured to provide underwater image color correction, based on the underwater depth perception. In some cases, the computing system is further configured to generate and communicate instructions to a control system of the submersible device for navigation of the device, based on the underwater depth perception. Also, the computing system can be further configured to generate and communicate instructions to a control system of a manipulator of the submersible device to enhance control and operations of the manipulator, based on the underwater depth perception.

And, the computing system can be further configured to automate underwater target recognition, based on the underwater depth perception.

Figure 10:
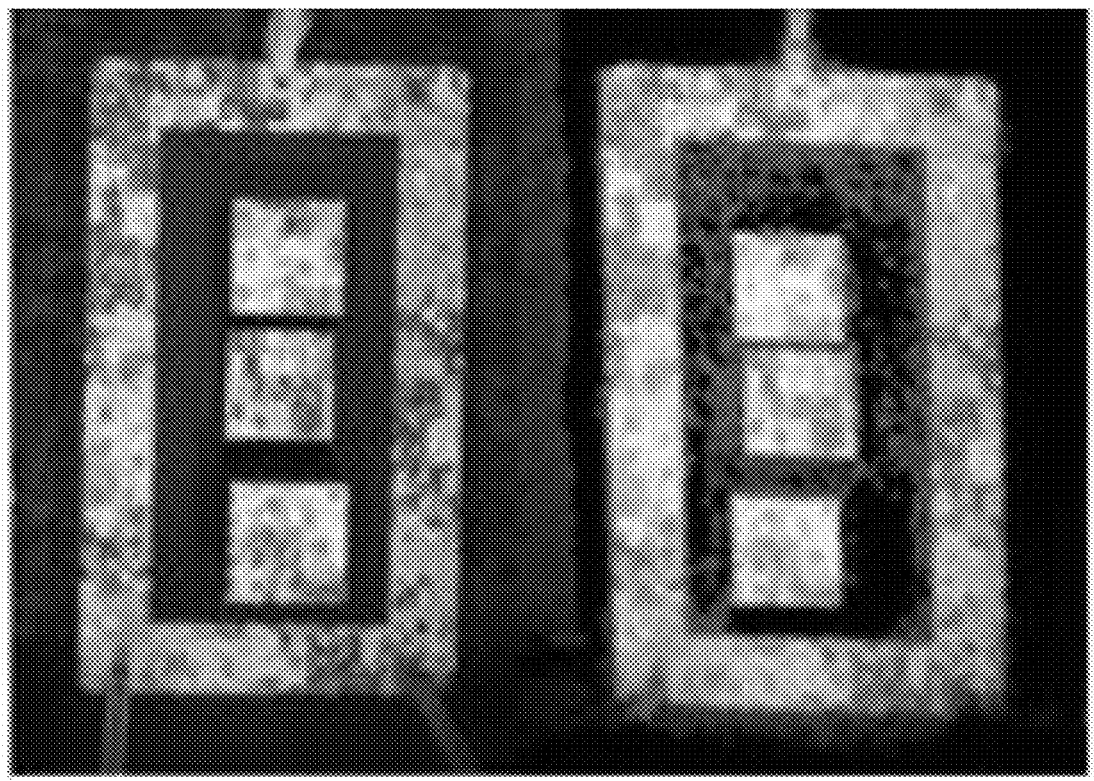
FIGS. 10 to 13 illustrate applications of depth perception in accordance with some embodiments of the present disclosure.

For example, FIG. 10 illustrates an example result of running camera images through an image processing pipeline using data captured from either a pair of image sensors or a combination of an image sensor and a complementary sensor. Specifically, FIG. 10 shows a 3D point cloud derived from the camera image to the left of it and additional data. Any one of the computing systems described herein can output, in real time, both an image and a 3D point cloud for consumption, as illustrated in FIG. 10. In some examples, 3D points are referenced to the camera's origin and provide the exact distance from the camera to any feature on objects shown in the 3D point cloud.

Also, computing hardware described herein can use sequential images from an image sensor as well as complementary images or data sensed by a second sensor to define and to generate a depth map or a three-dimensional model (e.g., a high-resolution depth map or a 3D point cloud such as the one shown in FIG. 10). In some examples, the generation of the map or the model can occur in real-time onboard the submersible device. The complementary data used in combination with the camera image as input for the processing pipeline can include a second camera image (such as a second 2D image) or data provided from an IMU device, a pressure sensor, an FLS device, a DVL device, a USBL device, an INS device, or the like, or a combination thereof.

Figure 11:
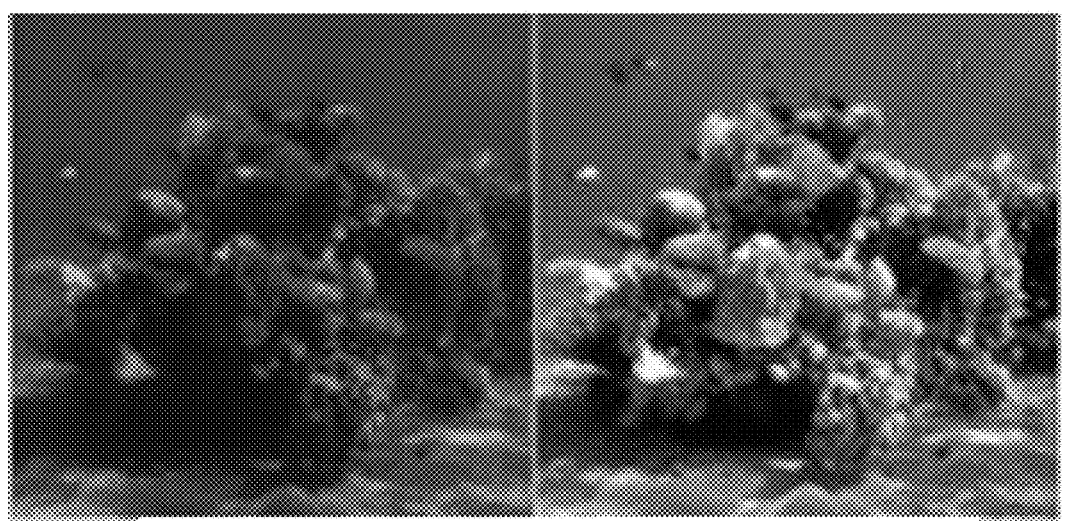

In addition to generating a depth map or a three-dimensional model (e.g., a 3D point cloud) as a product of the depth perception, many other applications can use the depth perception or derivatives thereof (such as a depth map or a three-dimensional model). For example, FIG. 11 depicts real-time color correction based on the depth perception or one of the derivatives of the depth perception described herein (e.g., a depth map or a three-dimensional model). Specifically, shown is a real-time color-corrected image derived from the camera image to the left of it and additional data. Similar to the point cloud, in some embodiments, pixels are referenced to the camera's origin and provide the exact distance from the camera to any feature on objects shown in the color-corrected image. Also, FIGS. 10 and 11 each illustrate images that can be displayed on a display of a user interface device (e.g., see user interface 216 shown in FIG. 2).

In some embodiments, an application of the depth perception includes onboard real-time image color correction. In some cases, the color correction can use high-resolution depth information as input. underwater optical images inherently undergo a color shift caused by the unequal absorption of light by the water medium. Each color channel (red, green, blue) can be absorbed differently, as a function of distance traveled. It is not possible to accurately correct an image to its true color without an understanding of the distance from the camera to each portion of the image. With this understanding, the color channel absorption can be accurately calculated, allowing for colors to be accurately corrected. By using the depth information described herein, the absorption calculation and subsequent color correction can be executed in real time within an image processing pipeline (such as one of the pipelines mentioned herein). In some examples, a color camera and computing system using the immediately calculated depth maps to understand object distance across the camera field of view can use the information to accurately correct the color of captured images in a continuous processing pipeline.

Figure 12:

In addition to color correction, another application of the depth information can include subsea vehicle navigation using the real-time relative positioning in the depth information to understand a vehicle's relative position to an observed object. FIG. 12 shows an example of a subsea vehicle being controlled and navigated according to the depth perception described herein. For subsea vehicles to navigate a subsea environment autonomously, or semi-autonomously, without human control, they use real-time sensor data to actively adjust their position relative to features in the environment. The use of sensor data may be for the vehicle to traverse a structure while maintaining a specific standoff distance, maintain its position (e.g., station keeping), follow a target, etc. In some embodiments, the system can achieve such navigation and control using a combination of inertial navigation data to understand the vehicle's motion and sonar data to determine the vehicle's relative position to targets. Optical depth information can be used in combination with the aforesaid data to enhance the control and navigation. In such examples, by using real-time optical depth information generated by a system described herein, automated or semi-automated navigation can be aided and informed by 3D optical data, a depth map, or a three-dimensional model. This optical depth information can be used in the control software to control the vehicle's motion relative to observable features in the environment, controlling either its distance to the target, relative orientation, or speed, for example.

Figure 13:
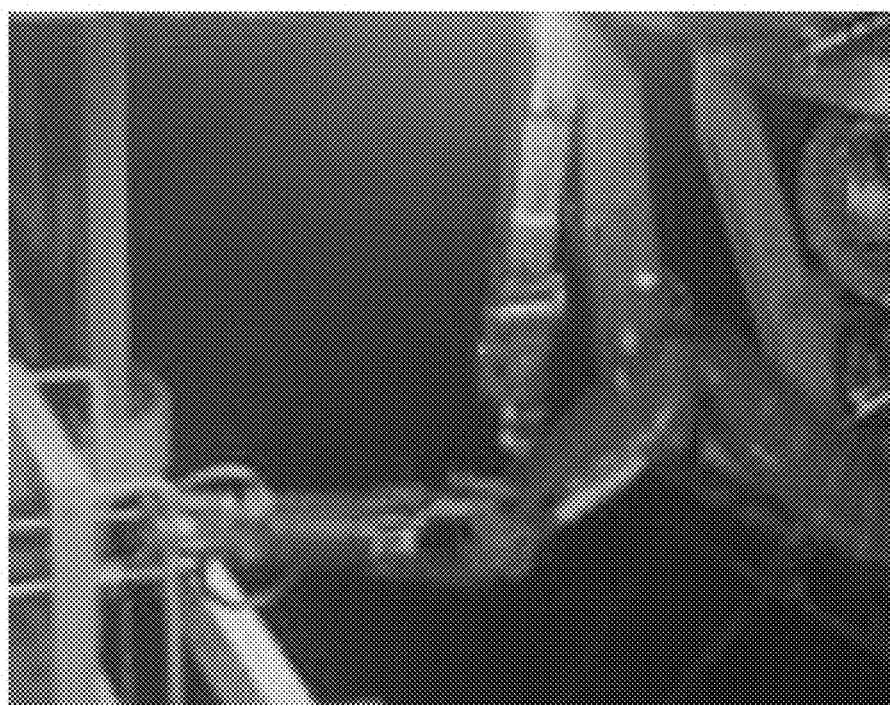

Also, an application of the depth information can include automated vehicle manipulator control utilizing a real-time generated depth map or any of the other depth information described herein. FIG. 13 shows an example of a manipulator of a subsea vehicle being controlled according to the depth perception described herein. The depth perception described herein can be used by underwater vehicles that utilize robotic manipulators to interact with the subsea environment, including for picking up targets of interest (e.g., using a gripper), fabricating assets, etc. Such interactions with objects underwater are often coordinated by a human operator who manually controls the manipulator using a video feed from the vehicle. As underwater vehicles seek to become autonomous, manipulators and other robotic elements can become autonomous as well. In some instances, autonomous manipulation can use sonar data to gain a real-time understanding of the manipulator's position relative to the target, informing the control software how to move the manipulator. And, the depth information described herein can enhance the sonar data to improve the autonomous manipulation by manipulators. Also, by using real-time optical depth information generated by a system described herein, automated or semi-automated underwater robotics can be aided and informed by 3D optical data, a depth map, or a three-dimensional model.

Related to the automation of manipulators and vehicle navigation underwater as well as subsea robotics, the depth perception described herein can be applied to underwater target recognition. Target recognition assisted through the depth perception can include 3D automated target recognition using real-time depth information. In some cases, using real-time optical 3D data for the rapid automatic identification and classification of a subsea target can be supported by the depth perception. Such an application of the depth perception can be useful for the military on other mission-critical subsea applications. The targeting can include identifying the type and size of objects using the depth perception. And, in some examples, the depth perception can be used for identifying mines underwater or other hazardous objects with fine-grain specificity and speed. Such use of the depth perception can use real-time 3D optical data to compare the observed target model to a database of mine shapes to classify the mine type or another object type. Also, the data can be used to automatically calculate the volume of the target to determine its size.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computing system, or similar electronic computing device, which manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the methods. The structure for a variety of these systems will appear as set forth in the description herein. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. A system, comprising:
   image sensors, arranged on different axes and configured to complement each other, and each one of the image sensors comprising any type of sensor that captures an image based on reflected or emitted electromagnetic radiation or mechanical waves;
   a computing system, configured to provide underwater depth perception based on data captured by the image sensors; and
   a submersible device, comprising a holder, the holder configured to hold the image sensors and the computing system, and wherein computing by the computing system to provide the underwater depth perception occurs onboard the submersible device,
   wherein the computing system and the image sensors are configured to operate together to measure a relative position of an object in images captured by the image sensors to provide the underwater depth perception,
   wherein the computing system is configured to select a feature between two image sensors of the image sensors to calculate a distance between the selected feature and the object and to provide the underwater depth perception,
   wherein the computing system is configured to perform the measurement of the relative position of the object in the images using triangulation,
   wherein the computing system is configured to perform the triangulation, and wherein the triangulation is based on respective observations of the object by the two image sensors, a known distance between the two image sensors that defines a base, and respective angles between the base and respective rays corresponding to the respective observations of the object,
   wherein the two sensors are configured to observe the object according to respective rays beginning at respective starting points at the two sensors and extending towards a selected point on a surface of the object,
   wherein the computing system is configured to use the respective starting points of the rays and the selected point on the surface of the object to define a spatial triangle for the triangulation,
   wherein the computing system is configured to:
      use the known distance between the two sensors as a base of the spatial triangle;
      determine angles between the base and the respective rays corresponding to the respective observations of the object;
      use the determined angles to determine the intersection point of the respective rays to provide a spatial coordinate of the selected point on the surface of the object according to triangular relations; and
      use triangular relations to determine the distance between the selected feature and the point on the surface of the object and to provide the underwater depth perception,
   wherein the computing system is configured to generate an underwater three-dimensional model based on the data captured by the respective image sensors,
   wherein the model comprises a plurality of distances between the selected feature and objects underwater, and
   wherein the plurality of distances between the selected feature and the objects underwater comprise the determined distance between the selected feature and the point on the surface of the object.

2. The system of claim 1, wherein the image sensors consist of a pair of sensors that sense reflected electromagnetic energy.

3. The system of claim 1, further comprising a stereo camera that comprises the image sensors and that is configured to capture three-dimensional images using the image sensors.

4. The system of claim 3, wherein the image sensors consist of a pair of image sensors of the camera.

5. The system of claim 1, wherein the submersible device comprises a submersible mobile machine.

6. The system of claim 5, wherein the submersible mobile machine comprises a submersible robot.

7. The system of claim 5, wherein the submersible mobile machine comprises a submersible vehicle.

8. The system of claim 7, wherein the submersible vehicle is a submarine or a submersible.

9. The system of claim 8, wherein the image sensors and the computing system are configured to operate effectively while the submersible device and the holder are completely submerged.

10. The system of claim 1, wherein the computing system is further configured to provide underwater depth perception based on raw data captured by the image sensors.

11. A system, comprising:
    image sensors, arranged on different axes and configured to complement each other, and each one of the image sensors comprising any type of sensor that captures an image based on reflected or emitted electromagnetic radiation or mechanical waves;
    a computing system, configured to provide underwater depth perception based on data captured by the image sensors; and
    a submersible device, comprising a holder, the holder configured to hold the image sensors and the computing system, and wherein computing by the computing system to provide the underwater depth perception occurs onboard the submersible device,
    wherein the computing system and the image sensors are configured to operate together to measure a relative position of an object in images captured by the image sensors to provide the underwater depth perception,
    wherein the computing system is configured to select a feature between two image sensors of the image sensors to calculate a distance between the selected feature and the object and to provide the underwater depth perception,
    wherein the computing system is configured to perform the measurement of the relative position of the object in the images using triangulation,
    wherein the computing system is configured to perform the triangulation, and wherein the triangulation is based on respective observations of the object by the two image sensors, a known distance between the two image sensors that defines a base, and respective angles between the base and respective rays corresponding to the respective observations of the object, wherein the two sensors are configured to observe the object according to respective rays beginning at respective starting points at the two sensors and extending towards a selected point on a surface of the object, wherein the computing system is configured to use the respective starting points of the rays and the selected point on the surface of the object to define a spatial triangle for the triangulation, wherein the computing system is configured to:
  use the known distance between the two sensors as a base of the spatial triangle;
  determine angles between the base and the respective rays corresponding to the respective observations of the object;
  use the determined angles to determine the intersection point of the respective rays to provide a spatial coordinate of the selected point on the surface of the object according to triangular relations; and
  use triangular relations to determine the distance between the selected feature and the point on the surface of the object and to provide the underwater depth perception, wherein the computing system is configured to generate an underwater depth map based on the data captured by the respective image sensors, wherein the map comprises a plurality of distances between the selected feature and objects underwater, and wherein a plurality of distances between the selected feature and the objects underwater comprise the determined distance between the selected feature and the point on the surface of the object.

12. The system of claim 11, wherein the image sensors consist of a pair of sensors that sense reflected electromagnetic energy.

13. The system of claim 11, further comprising a stereo camera that comprises the image sensors and that is configured to capture three-dimensional images using the image sensors.

14. The system of claim 13, wherein the image sensors consist of a pair of image sensors of the camera.

15. The system of claim 11, wherein the submersible device comprises a submersible mobile machine.

16. The system of claim 15, wherein the submersible mobile machine comprises a submersible robot.

17. The system of claim 15, wherein the submersible mobile machine comprises a submersible vehicle.

18. The system of claim 17, wherein the submersible vehicle is a submarine or a submersible.

19. A system, comprising:
  image sensors, arranged on different axes and configured to complement each other, and each one of the image sensors comprising any type of sensor that captures an image based on reflected or emitted electromagnetic radiation or mechanical waves;
  a computing system, configured to provide underwater depth perception based on data captured by the image sensors; and
  a submersible device, comprising a holder, the holder configured to hold the image sensors and the computing system, and wherein computing by the computing system to provide the underwater depth perception occurs onboard the submersible device,
    wherein the computing system and the image sensors are configured to operate together to measure a relative position of an object in images captured by the image sensors to provide the underwater depth perception,
    wherein the computing system is configured to select a feature between two image sensors of the image sensors to calculate a distance between the selected feature and the object and to provide the underwater depth perception,
    wherein the computing system is configured to perform the measurement of the relative position of the object in the images using triangulation,
    wherein the computing system is configured to perform the triangulation, and wherein the triangulation is based on respective observations of the object by the two image sensors, a known distance between the two image sensors that defines a base, and respective angles between the base and respective rays corresponding to the respective observations of the object,
    wherein the two sensors are configured to observe the object according to respective rays beginning at respective starting points at the two sensors and extending towards a selected point on a surface of the object,
    wherein the computing system is configured to use the respective starting points of the rays and the selected point on the surface of the object to define a spatial triangle for the triangulation,
    wherein the computing system is configured to:
      use the known distance between the two sensors as a base of the spatial triangle;
      determine angles between the base and the respective rays corresponding to the respective observations of the object;
      use the determined angles to determine the intersection point of the respective rays to provide a spatial coordinate of the selected point on the surface of the object according to triangular relations; and
      use triangular relations to determine the distance between the selected feature and the point on the surface of the object and to provide the underwater depth perception,
    wherein the computing system is configured to generate an underwater depth map based on the data captured by the respective image sensors,
    wherein the map comprises a plurality of distances between the selected feature and objects underwater,
    wherein a plurality of distances between the selected feature and the objects underwater comprise the determined distance between the selected feature and the point on the surface of the object, and
    wherein the submersible device comprises a mobile machine.

20. The system of claim 19, wherein the mobile machine comprises a submersible robot or a submersible vehicle.

* * * * *